United States Patent [19]

Kawaguchi et al.

[11] Patent Number: 5,446,551
[45] Date of Patent: Aug. 29, 1995

[54] TAPE DUPLICATING APPARATUS

[75] Inventors: Yuki Kawaguchi; Yohji Hirai; Satoru Inoue; Kazuhiro Kita; Fumio Sekiguchi, all of Kanagawa, Japan

[73] Assignee: Sony Corporation, Tokyo, Japan

[21] Appl. No.: 866,321

[22] Filed: Apr. 9, 1992

[30] Foreign Application Priority Data

Apr. 13, 1991 [JP] Japan .................................. 3-108399
Apr. 13, 1991 [JP] Japan .................................. 3-108400
Apr. 13, 1991 [JP] Japan .................................. 3-108401

[51] Int. Cl.$^6$ ............................................. H04N 5/76
[52] U.S. Cl. ........................................ 358/335; 360/15
[58] Field of Search ............... 358/335, 311, 313, 312, 358/194.1; 369/84, 85, 44.33, 83; 360/15, 14.1, 14.2, 14.3

[56] References Cited

U.S. PATENT DOCUMENTS

| | | | |
|---|---|---|---|
| 4,210,779 | 7/1980 | Simokat | 179/2.51 |
| 4,410,917 | 10/1983 | Newdoll et al. | 360/15 |
| 4,455,634 | 6/1984 | Efron et al. | |
| 4,564,940 | 1/1986 | Yahata | 370/124 |
| 4,578,718 | 3/1986 | Parker et al. | 360/10.3 |
| 4,628,370 | 12/1986 | Fukuoka | 360/15 |
| 4,733,776 | 3/1988 | Ward | 206/305 |
| 4,899,230 | 2/1990 | Sherrit | 360/15 |
| 5,055,937 | 10/1991 | Yamada et al. | 358/335 |
| 5,126,990 | 6/1992 | Efron et al. | 369/58 |
| 4,860,379 | 5/1999 | Schoeneberger et al. | 455/5 |

OTHER PUBLICATIONS

Journal of Society of Motion Picture & Tel. Eng. vol. 88, No. 12, Dec. 1979, N.Y. USA pp. 831-834 Heinz-Dieter Geise 'the use of microcomputers and microprocessors in modern VTR control'.

SMPTE Journal vol. 87, No. 11, Nov. 1978, N.Y. USA pp. 761-763 W. G. Connolly 'videotape program production at cbs studio center' p. 763 paragraph "Helical VTR Synchronizer".

*Primary Examiner*—Tommy P. Chin
*Assistant Examiner*—Robert Chevalier
*Attorney, Agent, or Firm*—William S. Frommer; Alvin Sinderbrand

[57] ABSTRACT

In an apparatus for producing duplicate tapes by transmitting signals reproduced by a master VTR to a plurality of duplicating VTRs for simultaneous recording on respective tapes in the latter; control signals from a bidirectional remote control unit are modulated with a first modulating frequency and are transmitted over a bidirectional control signal line to the duplicating VTRs. If a response is required from one of the duplicating VTRs, response signals from such duplicating VTR are modulated with a second modulating frequency different from the first modulating frequency and, during a pause in signal transmission from the remote control unit, the modulated response signals are transmitted to the remote control unit over the bidirectional control signal line. A test signal is transmitted to the duplicating VTRs in place of the signal reproduced by the master VTR, and defects in the recording operation of the duplicating VTRs are detected from playback of the test signal recorded by the respective duplicating VTRs.

3 Claims, 9 Drawing Sheets

TAPE DUPLICATING APPARATUS

BACKGROUND OF THE INVENTION

Field of the Invention

This invention relates generally to an apparatus for simultaneously preparing duplicate tapes by transmitting video and audio signals from video and audio signal sources to a plurality of tape recording devices for recording by the latter on respective tapes.

DESCRIPTION OF THE PRIOR ART

Apparatus presently exists in which video and audio signals being reproduced by one or more master video tape recorders or video disc players are transmitted to a substantial plurality of duplicating or slave VTRs for simultaneous recording, that is, copying or dubbing, by all of the duplicating or slave VTRs on respective tapes. In such apparatus for preparing duplicate tapes, operators are needed to supervise the operations of the duplicating or slave VTRs so as to remove from the apparatus any of such duplicating or slave VTRs that appear to be malfunctioning. Alternatively, operators are needed to reproduce or playback each duplicate tape and to remove from the goods to be marketed any of such tapes containing defects in recording. If duplicated tapes containing recording defects were permitted to enter the marketplace, commercial trust in such goods would be substantially deteriorated.

Furthermore, if the number of duplicating or slave VTRs employed in the above described apparatus for preparing duplicate tapes is substantially increased, the control system for the duplicating VTRs becomes undesirably complex.

OBJECTS AND SUMMARY OF THE INVENTION

Accordingly, it is an object of this invention to provide a tape duplicating apparatus which avoids the above mentioned problems associated with the prior art.

More specifically, it is an object of this invention to provide a tape duplicating apparatus in which video and audio signals are transmitted from at least, one source thereof to a plurality of tape recording units or VTRs so as to be simultaneously recorded on respective tapes in such units, and in which such tape recording units are controlled in a manner to substantially simplify the connections thereto.

In accordance with an aspect of this invention, a tape duplicating apparatus having at least, one source of video and audio signals and a plurality of tape recording units connected with such source so that the tape recording units can simultaneously record the video and audio signals on respective tapes, is further provided with a bidirectional control signal line connected with all of the tape recording units, remote control means for generating command signals which are modulated with a first modulating frequency and then supplied through the bidirectional control signal line to the tape recording units, and means in each of the tape recording units for generating response signals in response to the received command signals, with such response signals being modulated with a second modulating frequency different from the first modulating frequency to provide modulated response signals also supplied through the bidirectional control signal line to the remote control means preferably in intervals between the transmission of the modulated command signals through such line. It will be appreciated that, by reason of the frequency and time-division multiplexing of the modulated command and response signals, as supplied through the bidirectional control signal line, a large plurality, for example, up to 1,000, of duplicating VTRs can be controlled by way of a single bidirectional control signal line.

It is another object of this invention to provide a tape duplicating apparatus, as aforesaid, in which the recording operations of the tape recording units or VTRs are automatically monitored, and any defective tape recording unit or VTR is rendered inoperative so as to minimize the need for operators to inspect all of the recorded duplicate tapes one-by-one.

In accordance with another aspect of this invention, in a tape duplicating apparatus having at least one source of video and audio signals transmitted to a plurality of tape duplicating units or VTRs having recording and playback modes and in which the video and audio signals from the source thereof are simultaneously recorded on respective tapes; a test signal is provided by a respective generating means and is applied to the tape duplicating units in the recording mode of the latter for recording the test signal on the respective tapes, whereupon the tape duplicating units are changed-over to the playback mode so as to reproduce the recorded test signal, and defects in the recording operations of the tape duplicating units are detected from the respective reproduced test signals.

It is another feature of this invention to provide a tape duplicating apparatus, as aforesaid, with control means responsive to the detection of a defect in the recording operation of a respective tape recording unit for rendering inoperative such tape recording unit.

In accordance with still another feature of this invention, a tape duplicating apparatus, as aforesaid, includes means for erasing the recorded test signal from a tape when no defect in the recording operation of the respective tape recording unit has been detected.

The above, and other objects, features and advantages of this invention, will be apparent in the following detailed description of illustrative embodiments of the invention, particularly when read in connection with the accompanying drawings forming a part hereof, and in which corresponding components are identified by the same reference numerals in the several views.

DETAILED DESCRIPTION OF PREFERRED EMBODIMENTS

Figure 1:
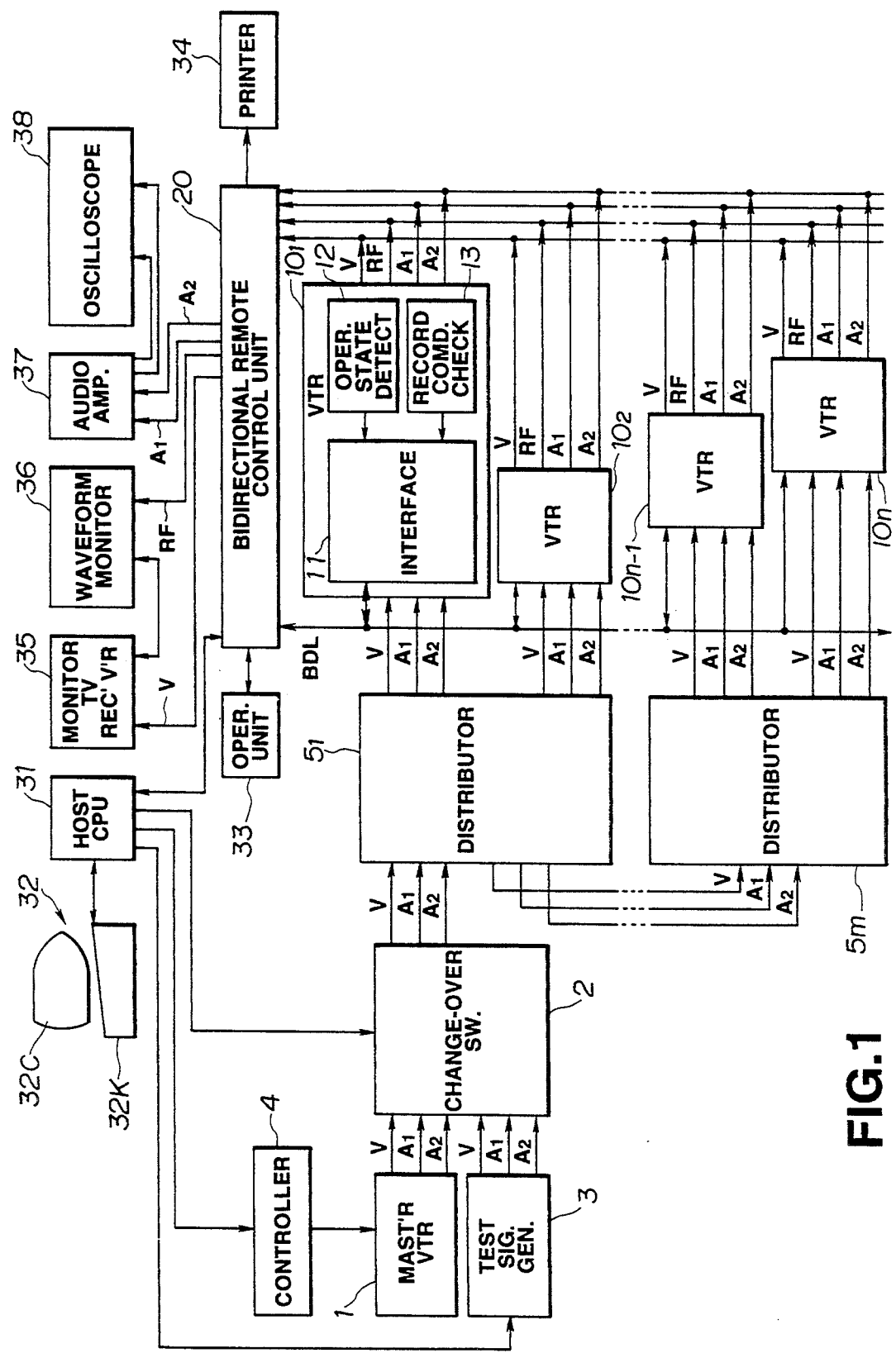
FIG. 1 is a block diagram showing a tape duplicating apparatus according to one embodiment of the present invention.

Referring to the drawings in detail, and initially to FIG. 1 thereof, it will be seen that, in an apparatus for preparing duplicate tapes according to an embodiment of the present invention there illustrated schematically, a so-called D-2 format digital VTR, for example, is used as a master VTR 1 operating as a video and audio signal source. Video signals V and two-channel audio signals $A_1$, $A_2$, associated with stereo left and right channels, are transmitted from the master VTR 1 to plural tape recording units, such as, n VTRs $10_1$, $10_2$, ... $10_{n-1}$, $10_n$, for simultaneously preparing a plurality of, for example, n duplicate tapes. More specifically, the signals from the master VTR 1 are transmitted through a changeover switch 2 to distributors $5_1$ to $5_m$ and thence distributed to the n VTRs $10_1$ to $10_n$. If the master VTR 1 is a digital VTR, D/A converters (not shown in FIG. 1) are provided in the distributors $5_1$ to $5_m$. The changeover switch 2 selects a video signal V and 2-channel audio signals $A_1$, $A_2$ from master VTR 1 or a test video signal V and test audio signals $A_1$, $A_2$ from a test signal generator 3 for transmission of the selected signals to the D VTRs $10_1$ to $10_n$.

A remote control unit 20 is connected to the D VTRs or recording units $10_1$ to $10_n$ for transmitting and receiving control signals to and from the units over a bidirectional control signal line BDL, such as, a so-called BNC coaxial cable. The n VTRs $10_1$ to $10_n$ are connected to the bidirectional control signal line BDL by so-called T- connectors (not shown). The remote control unit 20 is connected to a host CPU 31 over a bus line conforming to the so-called RS-232C serial interface standard.

An input/output terminal unit 32 having a CRT monitor 32C and a key input unit or keyboard 32K is connected to the host CPU 31. An operating unit 33 is also connected to the remote control unit 20 by a connection conforming to the RS-232C serial interface standard. The operating unit 33 is provided with operating keys for remote operation of the recording units or VTRs $10_1$ to $10_n$. The remote control unit 20 is further connected to a printer 34 for obtaining a printed record of data. The host CPU 31 controls the operation of the master VTR 1 through a controller 4 and also controls the change-over operations of the switch 2 and the operation of the test signal generator 3.

When any one of the VTRs $10_1$ to $10_n$ is in its reproducing or playback mode, the respective reproduced video signals V, RF signals RF and 2-channel audio signals $A_1$, and $A_2$, associated with left and right stereo, channels, are transmitted from such VTR over a common video signal line, an RF signal line and two-channel audio signal lines through the remote control unit 20 to a monitor TV receiver 35, a waveform monitor 36 and a two-channel audio amplifier 37. Two-channel audio signals are further transmitted from the audio amplifier 37 to an oscilloscope 38. The monitor TV receiver 35, waveform monitor 36 and the two-channel audio amplifier 37 are used for monitoring or observing the waveform of the video signal V, RF signal RF and the two-channel audio signals $A_1$ and $A_2$ from a selected one of the VTRs $10_1$ to $10_n$ designated by the remote control unit 20. The monitor TR receiver 35 is also adapted for displaying, by so-called superimposition, data transmitted or received over the signal line BDL.

In one or more of the VTRs, such as in VTR $10_1$, there is provided an interfacing circuit 11 connected to the bidirectional control signal line BDL. To this interfacing circuit 11, there are connected at least an operating state detecting circuit 12 for detecting the operating state, such as, a recording mode or a playback mode, of the associated VTR $10_1$, and for outputting information identifying the detected operating state, and a recording condition checking circuit 13 for determining if recording on the video tape is proceeding normally and for outputting information concerning the check results.

The remote control unit 20 transmits control signals for a desired operating mode, such as, recording mode control signals, to selected ones of the VTRs $10_1$ to $10_n$ to effect the simultaneous change-over of the selected VTRs to the recording mode. More specifically, the n VTRs $10_1$ to $10_n$ are desirably classified into groups each consisting of a desired number of the VTRs and the operating modes of all of the VTRs of a selected one of the groups are controlled simultaneously. The remote control unit 20 further designates a selected one of the VTRs in a selected group, such as, the VTR $10_1$, to cause detection signals to be transmitted from the operating state detecting circuit 12 of the designated VTR $10_1$ through the bidirectional control signal line BDL for determining therefrom if the designated VTR $10_1$ is in the recording mode. Up to 1,000 VTRs may be connected to the remote control unit 20 and may be classified into up to 100 groups, with the maximum number of VTRs in a group being 1,000. However, so-called collision detection is not implemented because it is desired to provide the simplest possible communication hardware in each of the up to 1,000 VTRs.

Since data outputted on the single bidirectional control signal line BDL by plural VTRs cannot be treated as an error, the remote control unit 20 is used to command communication with the VTRs $10_1$–$10_n$ one at a time. In other words, the remote control unit 20 designates an identification number (ID number) of the VTR to which a command is to be communicated. The ID number designated by the remote control unit 20 may be that for a single VTR or for a group of the VTRs. Furthermore, the modulation frequency of the command or control signals transmitted from the remote control unit 20 through the line BDL is selected to be different from that of response signals transmitted through the line BDL from the VTRs $10_1$ to $10_n$. Thus, frequency multiplexing, by using different transmission and reception frequencies, is employed in conjunction with time divisional multiplexing, which is achieved by transmitting signals from the VTRs only in response to signals received by the respective VTRs from the remote control unit 20, and which avoids signal overlapping on the signal line BDL. In such time divisional multiplexing, the remote control unit 20 first transmits control signals requesting a response from a selected one of the VTRs and subsequently halts transmission of control signals for a predetermined time to wait for a response from the selected VTR which, on reception of the request for response from the remote control unit 20, transmits a response signal during the above mentioned predetermined time.

The checking circuit 13 for determining the recording results achieved by the respective one of the VTRs $10_1$ to $10_n$ is responsive to signals obtained by reproduction of the recorded tape to check if recording has been proceeding properly. If recording has not been proceeding properly, the respective VTR is turned off so that its operating state detecting circuit 12 will indicate that the respective VTR is in its OFF mode. The information concerning the recorded results is outputted from the respective VTR and transmitted to the remote control unit 20 in response to a request signal from the remote control unit 20. In this case, the remote control unit 20 polls the n VTRs $10_1$ to $10_n$ to request the information concerning the test results, and such test information is displayed on the CRT monitor 32C or monitor TV receiver 35 and, if necessary, printed by the printer 34.

Figure 2:
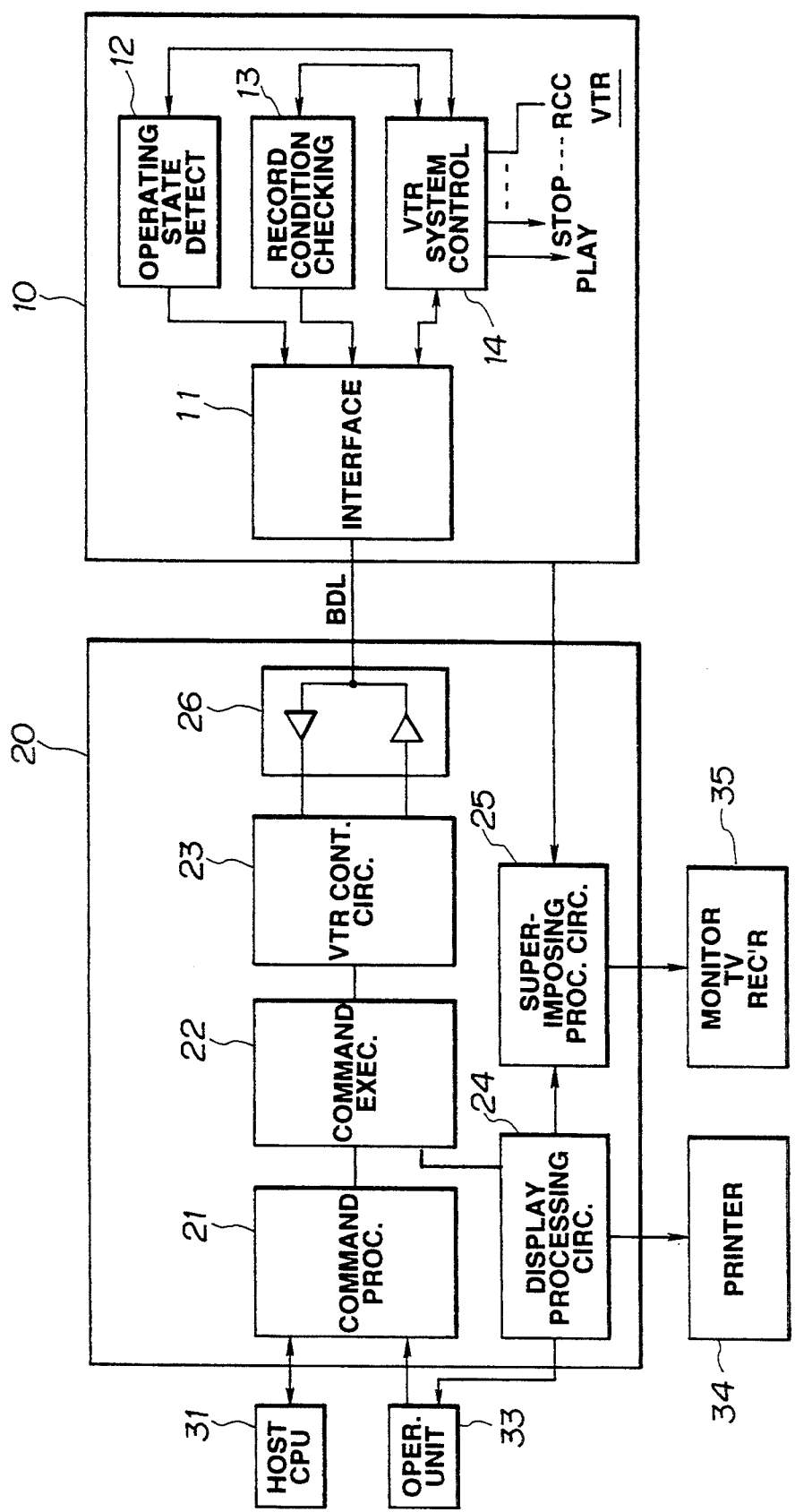
FIG. 2 is a block diagram showing, in greater detail, a bidirectional remote control unit and one of the duplicating VTRs included in the apparatus of FIG. 1.

Referring now to FIG. 2 which schematically shows in greater detail the arrangements of the bidirectional remote control unit 20 and of a selected one of the recording units or VTRs indicated at 10, it will be seen that the remote control unit 20 includes at least a command processing circuit 21 for command transmission and reception to and from the host CPU 31, a command execution circuit 22 connected to the command processing circuit 21 and a VTR control circuit 23 connected to the command executing circuit 22 for controlling the VTR 10 in response to the executed command. A display processing circuit 24 is connected to the command executing circuit 24 for providing display signals corresponding to the executed command and which are transmitted to the operating unit 33 and printer 34. An output command signal, produced on actuation of a respective operating key (not shown) of the operation unit 33, is transmitted from the operating unit 33 to the command processing circuit 21. Superimposition data for superimposed display on the monitor TV receiver 35 are provided by superimposition processing circuit 25 in response to the display signals from circuit 24 and are transmitted to the monitor TV receiver 35 for superimposition on picture signals from the VTR 10.

The VTR control circuit 23 is connected, through a bidirectional communication circuit 26, to the bidirectional control signal line BDL which is, in turn, connected to the bidirectional communication interfacing circuit 11 in the VTR 10. The operating state data from the operating state detection circuit 12 and data from the recording condition checking circuit 13 are transmitted to the interfacing circuit 11 and various data are exchanged between the interfacing circuit 11 and a system controller 14 of the VTR 10. The VTR system controller 14 transmits information, such as, servo lock information, monitored RF levels and the like, to the detection circuit 12 which determines therefrom if a recording operation is in progress, whereas, the system controller 14 transmits information on the presence or absence of the RF signals or the video signal level to the checking circuit 13 during reproduction of recorded test signals to determine if the recording of such test signals was properly performed.

Figure 3:
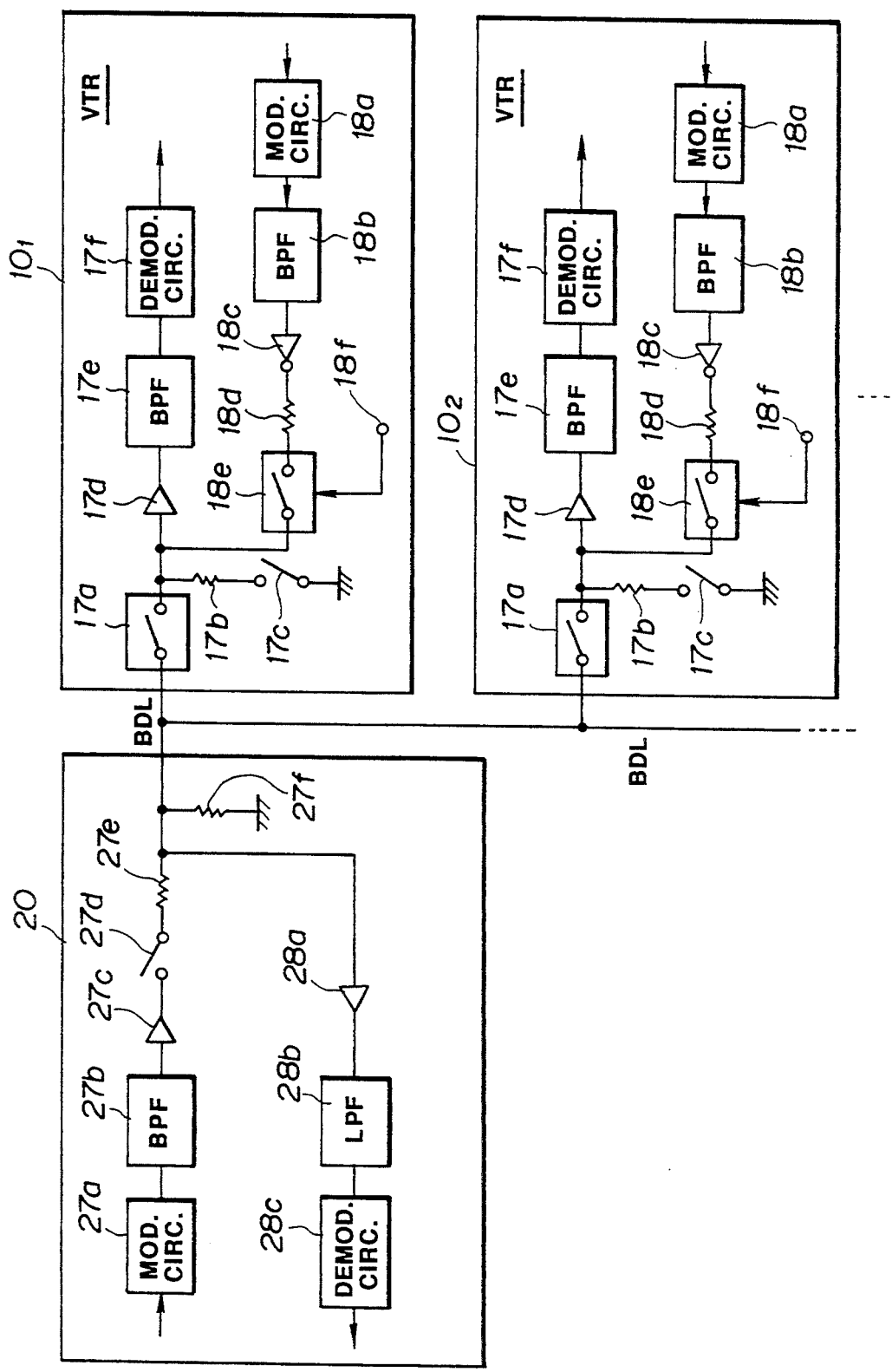
FIG. 3 is a block diagram further showing circuit arrangements included in the bidirectional remote control unit and the duplicating VTRs of the apparatus shown in FIG. 1.

Bidirectional communication between the bidirectional remote control unit 20 and each of the VTRs $10_1$, $10_2, \ldots 10_n$ will now be described with reference to FIG. 3, in which a first modulating circuit 27a in the bidirectional remote control unit 20 is shown to receive control signals, for example, from the VTR control circuit 23 (FIG. 2) and modulates the same by a first modulation frequency, such as 800 kHz, before transmitting the modulated signal to a buffer amplifier 27c through a bandpass filter (BPF) 27b having the modulating frequency as its center transmission frequency. Output signals from buffer amplifier 27c are transmitted through a switch 27d and a resistor 27e to the bidirectional control signal line BDL. A junction point in the remote control unit 20 between resistor 27e and a terminal connected to the control signal line BDL is grounded through a resistor 27f of, for example, 75 Ω for impedance matching. In this manner, modulated control signals from the remote control unit 20 are transmitted with a modulation frequency of 800 kHz over signal line BDL to the VTRs $10_1$, $10_2$ ... $10_n$.

The VTRs $10_1$, $10_2$ ... $10_n$ are shown on FIG. 3 to be of similar construction. For example, in VTR $10_1$, a switch 17a has one terminal connected to the bidirectional control signal line BDL and another terminal grounded through a resistance 17b of, for example, 75 Ω, for impedance matching, and a switch 17c. The control signals passing through the switch 17a are further transmitted through a buffer amplifier 17d to a band pass filter (BPF) 17e having the above mentioned first modulating frequency of 800 kHz as its center transmission frequency, so that signals around the first modulating frequency are extracted and transmitted to a demodulating circuit 17f. In the demodulating circuit 17f, signals modulated by the first modulating frequency are demodulated and transmitted through the interfacing circuit 11 to the VTR system controller 14 (FIG. 2).

Impedance matching of the transmission line is achieved by closing or turning ON the switch 17a of the VTR being connected to the control signal line BDL, while the switches 17a of the remaining VTRs are all turned OFF or remain open.

The system controller 14 provided in the VTR (FIG. 2) controls the VTR operation when the transmitted control signal is addressed to all of the VTRs or at least to the associated VTR, and formulates response signals, such as, operating state detection signals from the operating state detection circuit 12, when the response is required. These response signals are transmitted to a modulating circuit 18a (FIG. 3) for modulation with a second modulating frequency, such as 200 kHz, which is different from the first modulating frequency, before being transmitted to a buffer amplifier 18c through a BPF 18b having the second modulating frequency of 200 kHz as its center transmission frequency. Output signals from buffer amplifier 18c are transmitted through a resistor 18d to a switch 18e which may be turned ON and OFF in response to control signals applied to a control input terminal 18f. Response signals from switch 18e are transmitted through switch 17a to the bidirectional control signal line BDL. The frequency characteristics of the BPFs 17e in VTRs $10_1$, $10_2, \ldots$ and of the BPF 27b in the remote control unit 20 are set so as to inhibit the passage therethrough of signals of the second modulating frequency, that is, 200 kHz.

The response signals, modulated with the second modulating frequency of, for example, 200 kHz, are transmitted through the control signal line BDL to the remote control unit 20 for delivery in the latter through a buffer amplifier 28a to a lowpass filter (LPF) 28b having its cut-off determined for transmitting signals around the second modulating frequency. With the second modulating frequency at, for example, 200 kHz, the LPF 28b has a cut-off frequency of the order of 400 kHz for inhibiting the passage therethrough of signals of the above mentioned first modulating frequency at about 800 kHz. The signals around the second modulating frequency, taken out from LPF 28b, are delivered to a demodulation circuit 28c for demodulation by the latter.

A particular example of a signal communication system that may be employed for transmission over the bidirectional control signal line BDL, is a start-stop synchronized all-duplex communication system with data units of 8 bits each, odd numbered parity check bits and a baud rate of 38400 bps. In the communication hardware between the remote control unit 20 and each of the VTRs $10_1$–$10_n$, collision detection is not performed and the remote control unit 20 commands the communication. In other words, the remote control unit 20 designates ID numbers or the like identifying a selected one of the VTRs $10_1$–$10_n$ and subsequently transmits actual commands. The IDs for the VTRs $10_1$–$10_n$ are classified into individual identification IDs and group identification IDs and a status response to a command may only be transmitted from the respective VTR directly after the command has been sent with a respective individual identification ID. Since communication between the bidirectional remote control unit 20 and the VTRs $10_1$–$10_n$ is a one-to-multiplicity type communication, handshaking, such as transmitting NAKs in the event of communication errors, cannot be employed. For this reason, the same data are sent a number of times to diminish the probability of data loss due to communication errors.

Figures 4, 5:
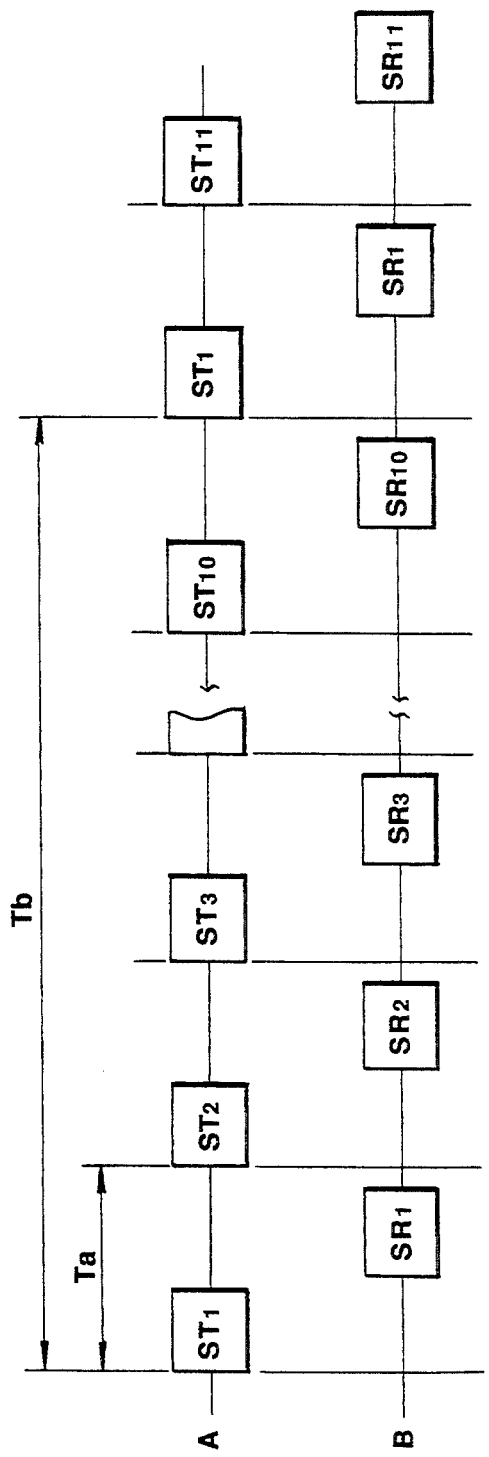
FIG. 4 is a diagrammatic view illustrating a communication format that is used in the apparatus of FIG. 1.
FIG. 5 is a timing chart illustrating the timed relationship between command signals transmitted from the remote control unit in the apparatus of FIG. 1 and responses to such command signals transmitted to the remote control unit from respective duplicating VTRs.

FIG. 4 shows a specific example of a communication format suitable for use for the commands to be transmitted from the bidirectional remote control unit 20 the VTRs and in which there are arrayed, from the leading end on, a 1-byte communication start signal STX, a 1-byte serial number SN, a 3-byte ID indicating the identification (ID) of the VTR to which the command is addressed, a number DN indicating the number of bytes of data in the following data part DATA, a check sum SUM indicating the sum of the data in the data part and a communication end signal ETX. The serial number SN is incremented by one for each new command. The receiving VTR checks this field to discern which command is being received. In the case of individual identification of the VTRs, of the three bytes of the ID field, the first byte denotes ten thousands and thousands by the upper and lower 4 bits thereof, respectively, the second byte denotes hundreds and tens by the upper and lower 4 bits thereof, respectively, and the third byte denotes units by the upper 4 bits thereof, with the lower 4 bits thereof being zero. In the case of identification of the VTRs by groups, the first, second and third bytes of the ID field indicate 255, 0 and the group number, respectively.

For transmitting signals from the bidirectional remote control unit 20 to the interfacing circuit 11 of a VTR, the signals are modulated by amplitude shift keying (ASK) in which "1" and "0" of the 38.4 kbps baud rate data are associated with a 800 kHz burst signal and zero V state, respectively. For transmitting signals from a VTR interfacing circuit 11 to the bidirectional remote control unit 20, the signals are modulated in such a manner that data "1" and "0" are associated with a 200 kHz burst signal and zero V state, respectively.

After a power source (not shown) of the remote control unit 20 is turned ON, self diagnoses and initialization of the unit are first performed, after which the VTRs connected to the remote control unit are checked to see if any one of the connected VTRs corresponds to the VTR individual ID number of a command or is included in the range of identification numbers represented by the group ID number included in the command.

For each of the VTRs, starting from the smallest ID number to the largest ID number, a VTR-ID designation command is transmitted, a response (ACK) is received and the VTRs that are connected to the remote control unit are determined and registered. The connection confirmation time for each VTR is not more than 30 msec, for example, which is multiplied by the number of the designated VTRs to give a total connection confirmation time. For checking the state of the connection, a suitable connection is confirmed when a response ACK is transmitted back to the unit 20 within 10 msec after command transmission. If there is no response ACK within 10 msec, or if the response NAK is transmitted, the operation is repeated once again and, if no response ACK is received, non-connection is confirmed.

After initialization of the bidirectional remote control unit 20, confirmation of its connection with the operating unit 33 and title display, the basic state for the usual operation is set. Starting from such basic state, a state for registration of the usual operations, a state for setting of the VTR modes, time setting states, a state for self-analyses of the VTRs, a state for setting of the VTR modes, a state for display of the VTR status, a state for setting of the user IDs or a state for setting of the VTR-IDs can be set in response to actuation of corresponding command keys of the operating unit 33. Any such operating state proceeds to an error state in the event an error occurs at the time of key entry. Although key entry is described as being effected at the operating unit 33, it is also possible to effect key entry by a key entry unit 32K of the input/output terminal device 32. Although display of the various operating states is by superimposition on a screen of the monitor TV screen 35, such display may also be made on the display section of the operating unit 33 or the CTR monitor 32C, or by printing by the printer 34.

In the above mentioned basic state, control of the VTRs under control, display of the operating states of the signal-selecting VTR, VTR-ID incrementation and decrementation and shifting to the above described states, are effected. The phrase "VTRs under control" means the VTRs within the VTR-ID range and thus the VTRs in the group confirmed to be connected, in the case of the group identification, and the VTR which has been identified in the case of individual identification, whether or not actual connection of that individual VTR has been confirmed. The "signal-selecting VTRs" mean those VTRs which are within the VTR-ID range and the video, audio and RF signals of which are selected. The operating states of these signal-selecting VTRs and the states of the VTRs under control are monitored and the displays thereof are suitably modified. The VTR-ID display is changed by VTR-ID incrementation or decrementation. A VTR control operating key is actuable in this basic state for operating the VTR.

By pressing a status key, for example, the operating state may be changed from the basic state to the VTR status display state. In the VTR status display state, the VTR setting state, the VTR error state and time meter are displayed. Corresponding data may be printed out by the printer 34 at this time. In the VTR error status display, the number of the VTRs in the error state, the VTR-IDs of the VTRs in the error state and the error codes and the like are displayed.

The bidirectional remote control unit 20 effects confirmation of connection, operating states and error states of the VTRs $10_1$–$10_n$. The VTRs under control, and mainly the signal-selecting VTRs, are monitored. In other words, the operating states of the signal-selecting VTRs, the error states of the signal-selecting VTRs and the error states of the VTRs other than the signal-selecting VTRs are confirmed repeatedly. The VTRs other than the signal-selecting VTRs are confirmed by sequentially scanning from the smallest ID to the largest ID in the VTR-ID range.

Referring now to FIG. 5, it will be assumed that the signal packet $ST_1$ indicates signals of the format shown in FIG. 4, transmitted from the bidirectional remote control unit 20 over the bidirectional control signal line BDL, and that the VTR-ID in the packet $ST_1$ identifies the first VTR $10_1$. In response to the transmitted packet $ST_1$, a responsive signal packet $SR_1$ is sent from the VTR $10_1$ over the bidirectional control signal line BDL. The time allocated to this one monitoring operation Ta, that is, the time from the start of transmission of the packet $ST_1$ until transmission of a packet $ST_2$ designated the next VTR $10_2$, is, for example, 80 msec. Thus, in the example given, the time of 1,000×Ta, or 80 sec is required for scanning the 1,000 VTRs connected to the control unit 20. If the first VTR $10_1$ is a signal-selecting VTR, this signal selecting VTR $10_1$ is monitored once for each predetermined number, such as, ten, of the monitoring operations. In such case, the monitoring period Tb for this signal-selecting VTR is 10×Ta or 800 msec. It will be noted that, if the signal-selecting VTR is monitored only by scanning the VTRs in their entirety, the operating states or the error states of the individual signal selecting VTRs may be updated only once in 80 sec, for the example given, so that the image displayed on the monitor screen may not accurately reflect the actual monitored operating states.

The operating states of the VTRs are detected by the respective operating state detection circuits 12. The states to be checked by each operating state detecting circuit 12 when monitoring the error states include tape unthread, tape troubles, head errors, servo alarm and system alarm. The states to be checked by the circuit 12 may also include such items as record mode flag, servo lock, tape end, failure of video signals and failure of synchronization signals, if the operating mode of the respective VTR is the recording mode. In this manner, recording commands are transmitted to, for example, all of the VTRs $10_1$–$10_n$ and, while the video or audio signals from the master VTR are being recorded or dubbed, the operating states of the VTRs are detected, that is, it is detected if these VTRs are in the normal recording mode. The number of the VTRs in error, that is, not in the normal recording mode, and the IDs and the error status of the VTRs in error are displayed or printed.

Figure 6:
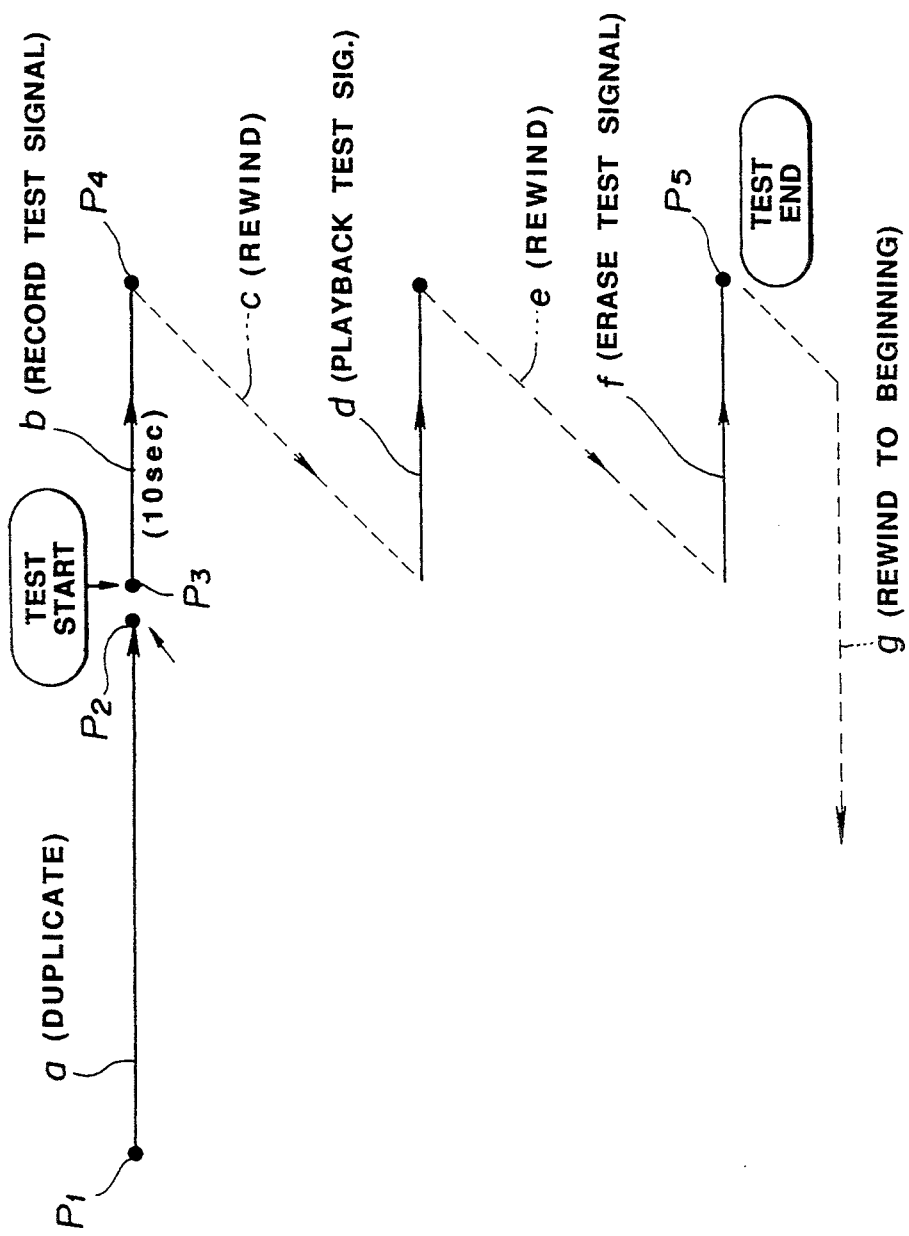
FIG. 6 is a diagrammatic view illustrating a procedure employed in the apparatus of FIG. 1 for determining if the recording operations of the duplicating VTRs are defective.

The operation of automatically checking the results of recording by the VTRs $10_1$–$10_n$, that is the operation of automatically recording test signals and inspecting the results of the recording, will now be explained with reference to FIG. 6. In FIG. 6, $P_1$ represents a dubbing start point on a video tape in a selected one of the VTRs $10_1$–$10_n$, and a video program to be duplicated is recorded or dubbed on the tape for an interval a from the start point $P_1$ to a point $P_2$. On completion of such dubbing, the host CPU 31 (FIG. 1) controls the bidirectional remote control unit 20 to cause the selected VTR to change-over to its fast-forward mode, whereby the tape is made to run at a high speed from the dubbing end point $P_2$ to a predetermined test signal recording start point $P_3$. The test signals are intended to be supplied from the test signal generator 3 to the VTRs through the change-over switch 2, and the test signal generator 3 and the change-over switch 2 are controlled by the host CPU 31 so as to cause test signals to be recorded from the point $P_3$ for an interval b, for example, of 10 sec., up to the point $P_4$. At the point $P_4$, the host CPU 31 causes the VTR to change-over to its rewind mode so as to effect high-speed rewind of the tape to a predetermined extent, as at c on FIG. 6. Then, the host CPU 31 causes the VTR to enter its reproducing or playback mode, at d on FIG. 6, for reproducing the recorded test signals. During playback, the reproduced test signals are checked by the recording result checking circuit 13 associated with the VTR, as shown in FIGS. 1 and 2.

Among the items that are checked during reproduction of the recorded test signals, are the presence or absence of RF signals, whether or not the video/sync signals have been detected, whether or not tracking is normal, and the presence or absence of audio signals. If unsatisfactory results are obtained after sequentially checking these items, the power source of the VTR undergoing the test is turned off and an alarm is actuated, for example, by turning alarm lamps on and off. Further, the VTRs are sequentially designated and monitored by the remote control unit 20 for displaying or printing the number and/or the IDs of the VTRs in which unsatisfactory recording of the test signals is detected.

After completion of the playback of the recorded test signal at d in FIG. 6, the tape is rewound, as at e, and then erased as at f, from a position slightly ahead of the point $P_3$. The tape is erased to a point $P_5$ which is beyond the point $P_4$ and at which the test is completed. In any case where playback of the recorded test signal indicates that the recording operation of the VTR in question has proceeded normally and without defect or error, from point $P_5$, the recorded tape is fully rewound, as at g on FIG. 6, and, at the conclusion of such rewinding operation, the recorded or duplicate tape is withdrawn from the respective VTR. By fully rewinding only those tapes indicated to be recorded properly, recorded tape cassettes suitable to be marketed can be readily distinguished from tape cassettes likely to contain recording defects.

Any VTRs found, during playback of the recorded test signal at d, to be recording defectively or otherwise experiencing trouble, are automatically turned off, and the recorded tapes are not extracted from such VTRs. Thus, the inconvenience and wasted effort of removing recorded tapes from VTRs that are not operating properly during the recording operation may be effectively avoided.

In the tape duplicating apparatus according to this invention described above with reference to FIG. 1, only a single master VTR 1 is provided for reproducing the master tape which is to be duplicated in all of the recording units or VTRs $10_1$–$10_n$ under the control of the single bidirectional remote control unit 20. Furthermore, in the apparatus described with reference to FIG. 1, the total number of the VTRs $10_1$–$10_n$ is practically limited to 1,000.

Figure 7:
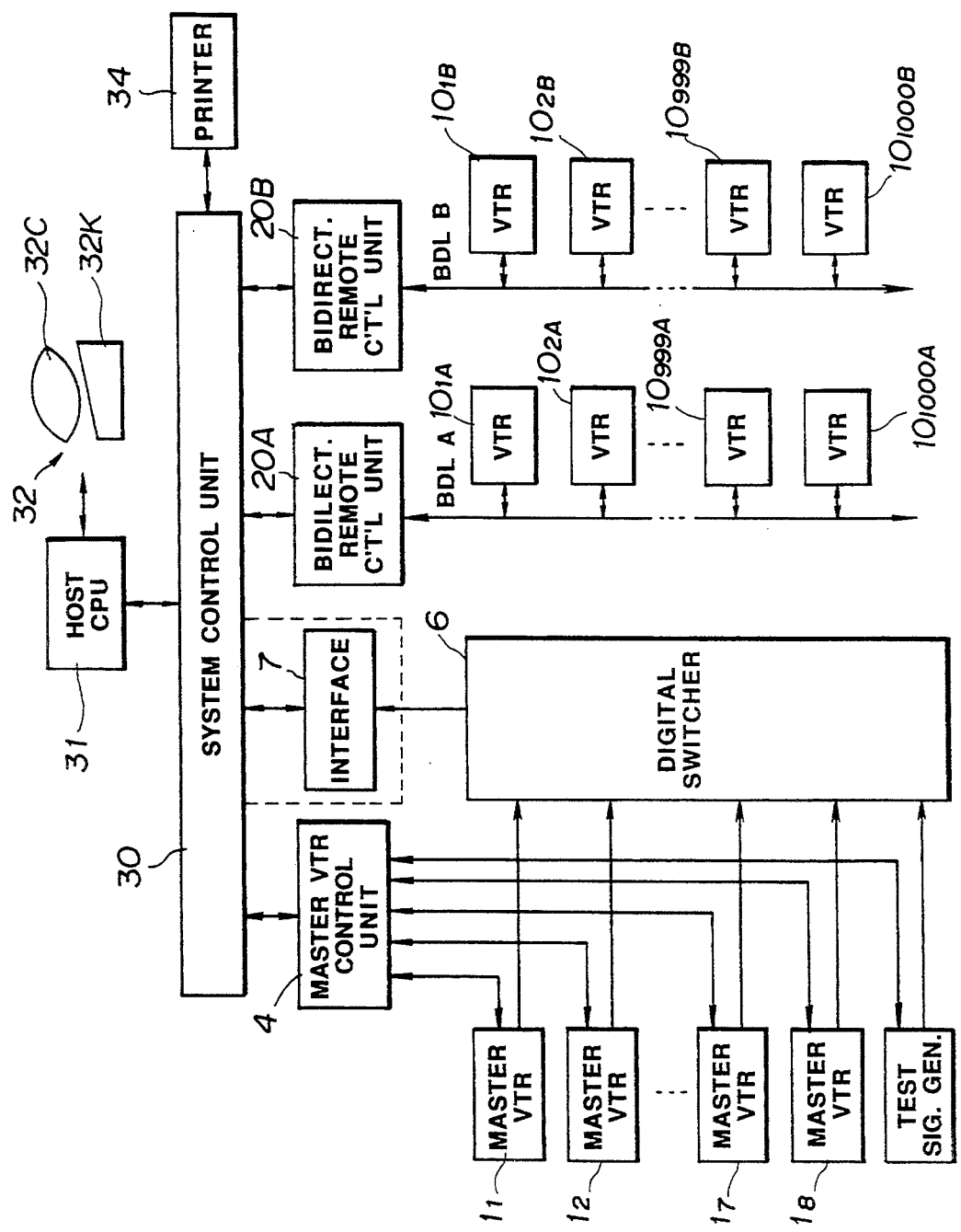
FIG. 7 is a block diagram of a tape duplicating apparatus according to another embodiment of the present invention which is of a larger scale than that shown on FIG. 1, and in which the control system of the tape duplicating apparatus is particularly illustrated.
Figure 8:
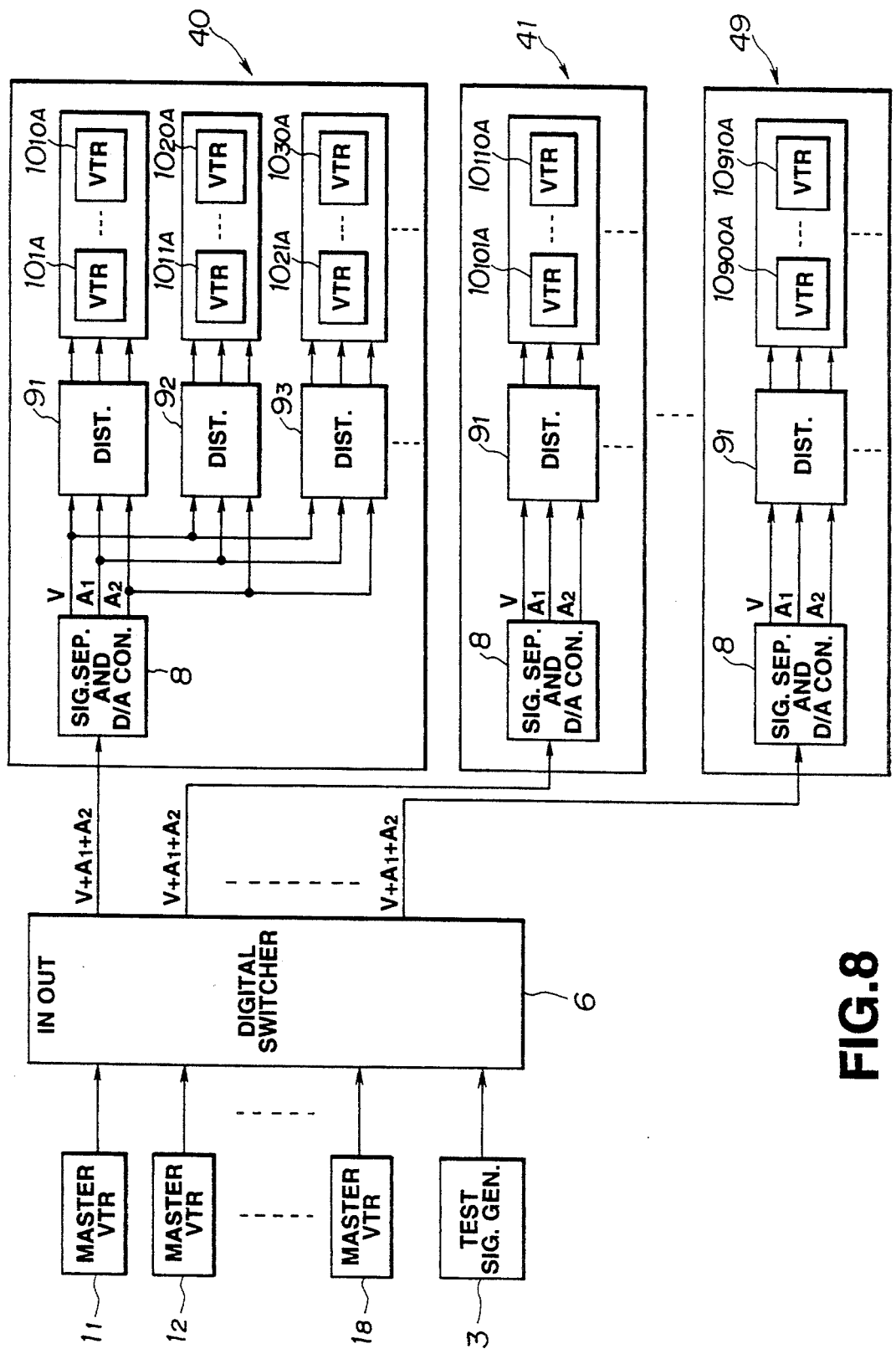
FIG. 8 is a block diagram particularly showing a video and audio signal transmitting system included in the tape duplicating apparatus of FIG. 7.

However, as shown on FIGS. 7 and 8, a tape duplicating apparatus according to another embodiment of this invention may employ a plurality of master VTRs, as at $1_1$–$1_8$ and may be capable of duplicating or dubbing tapes in up to 2,000 VTRs $10_{1A}$–$10_{1,000A}$ and $10_{1B}$–$10_{1,000B}$. It will be appreciated that FIG. 7 particularly shows the system in the tape duplicating apparatus for controlling the operations of the master VTRs $1_1$–$1_8$ and the recording units or VTRs in which the tapes are duplicated, while FIG. 8 particularly illustrates the system by which video and audio signals being reproduced in the master VTRs are selectively supplied to the various recording units or VTRs in which the duplicate tapes are to be recorded.

More specifically, in the embodiment of this invention shown in FIG. 7, two bidirectional remote control units 20A and 20B are connected through a system control unit 30 to the host computer 31 for performing bidirectional remote control operations of duplicating VTRs arranged in two channels, respectively. More specifically, the bidirectional remote control units 20A and 20B are connected through bidirectional control signal lines BDLA and BDLB, respectively, to VTRs $10_{1A}$–$10_{1,000A}$ and to VTRs $10_{1B}$–$10_{1,000B}$. The host computer 31 also controls, through the system control unit 30 and a master VTR remote control unit 4, the operations of the 8 master VTRs $1_1$–$1_8$, and also the operations of the test signal generator 3.

As shown on FIG. 8, serially transmitted digital video and audio signals from the master VTRs $1_1$–$1_8$ and from the test signal generator 3 are selectively delivered through a digital switcher 6 to signal separators or decombiners $8_1$–$8_{10}$ provided on several racks mounting respective groups 40–49 of the duplicating VTRs. The digital switcher 6 is connected to the system control unit 30 through an interfacing circuit 7. Each of the signal separators or decombiners $8_1$–$8_{10}$ includes a digital-to-analog converter and separates the serially transmitted digital video and audio signals obtained from the digital switcher 6 into separated analog video signals V and two-channel audio signals $A_1$ and $A_2$ which are transmitted through distributors $9_1$, $9_2$, $9_3$... to respective duplicating VTRs $10_{1A}$–$10_{10A}$, $10_{11A}$–$10_{20A}$, $10_{21A}$–$10_{30A}$, ... Since each of the signal separators $8_1$–$8_{10}$ is associated with a group 40–49 of the duplicating VTRs, for example, 100 of such VTRs, mounted on a respective rack with the respective signal separator or digital-to-analog converter, signals from different master VTRs may be simultaneously recorded on tapes in selected ones of the groups 40–49 of duplicating VTRs on different racks. Thus, if eight different master tapes are simultaneously played back by the master VTRs $1_1$–$1_8$, respectively, those eight master tapes can be duplicated simultaneously in eight different groups of the duplicating VTRs.

It will be appreciated that the embodiment of the invention described above with reference to FIGS. 7 and 8 is arranged and operates similarly to the embodiment described above with reference to FIG. 1 except to the extent specifically mentioned above in consequence of its employing a plurality of master VTRs and an increased number of duplicating VTRs arranged in two-channels, respectively, and communicating with respective bidirectional remote control units 20A and 20B through bidirectional control signal lines BDLA and BDLB, respectively.

Figure 9:
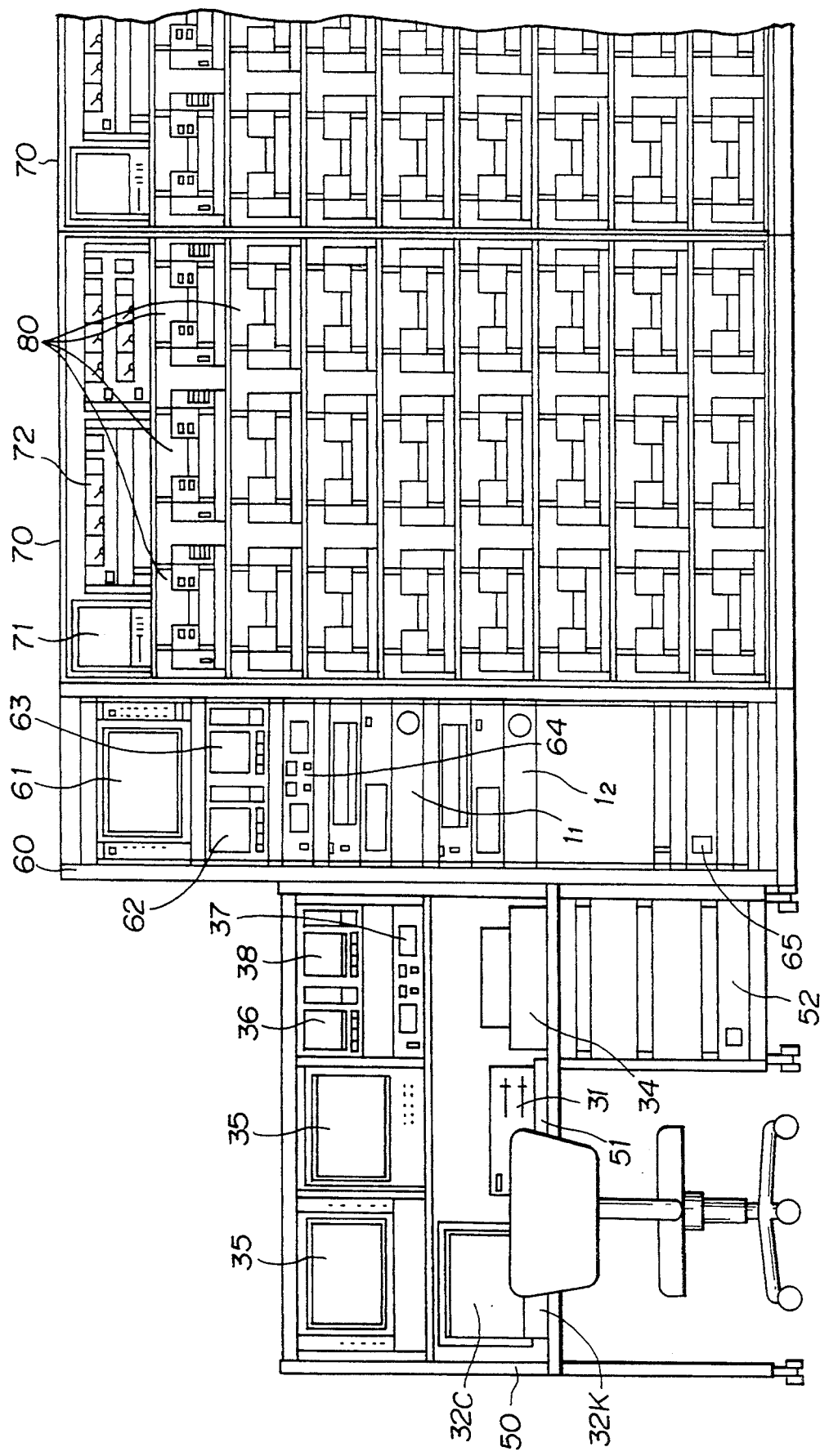
FIG. 9 is a front elevational view of a practical realization of the tape duplicating apparatus, for example, according to the embodiment shown on FIG. 1.

Referring now to FIG. 9, it will be seen that a practical embodiment of an apparatus for duplicating tapes in accordance with this invention generally comprises a rack 50 forming a remote control console, a rack 60 for the master VTRs, and one or more racks 70 for respective groups of the duplicating VTRs.

The rack 50 constituting a remote control console has mounted thereon the host CPU 31, keyboard 32K, CRT monitor 32C, printer 34, monitor TV receivers 35, waveform monitor 36, audio amplifier 37 and oscilloscope 38, all corresponding to the similarly identified elements in FIG. 1. The bidirectional remote control unit 20 and the operating unit 33 on FIG. 1 are contained in a single unit 51 on FIG. 9. Further, a power source 52 is provided at the rack 50 of the remote control console.

The master VTR rack 60 is provided with a monitor TV receiver 61, a vector scope 62, a waveform monitor 63, and audio amplifier 64, two digital VTRs 11 and 12 corresponding to the master VTR 1 on FIG. 1, and a power source 65.

Each of the plurality of racks 70 for the duplicating VTRs has mounted thereon a number of recording units or VTRs indicated at 80 on FIG. 9 and which correspond to the VTRs $10_1$–$10_n$ of FIG. 1, a monitor TV receiver 71 and a level meter 72, as may be required.

Figure 10:
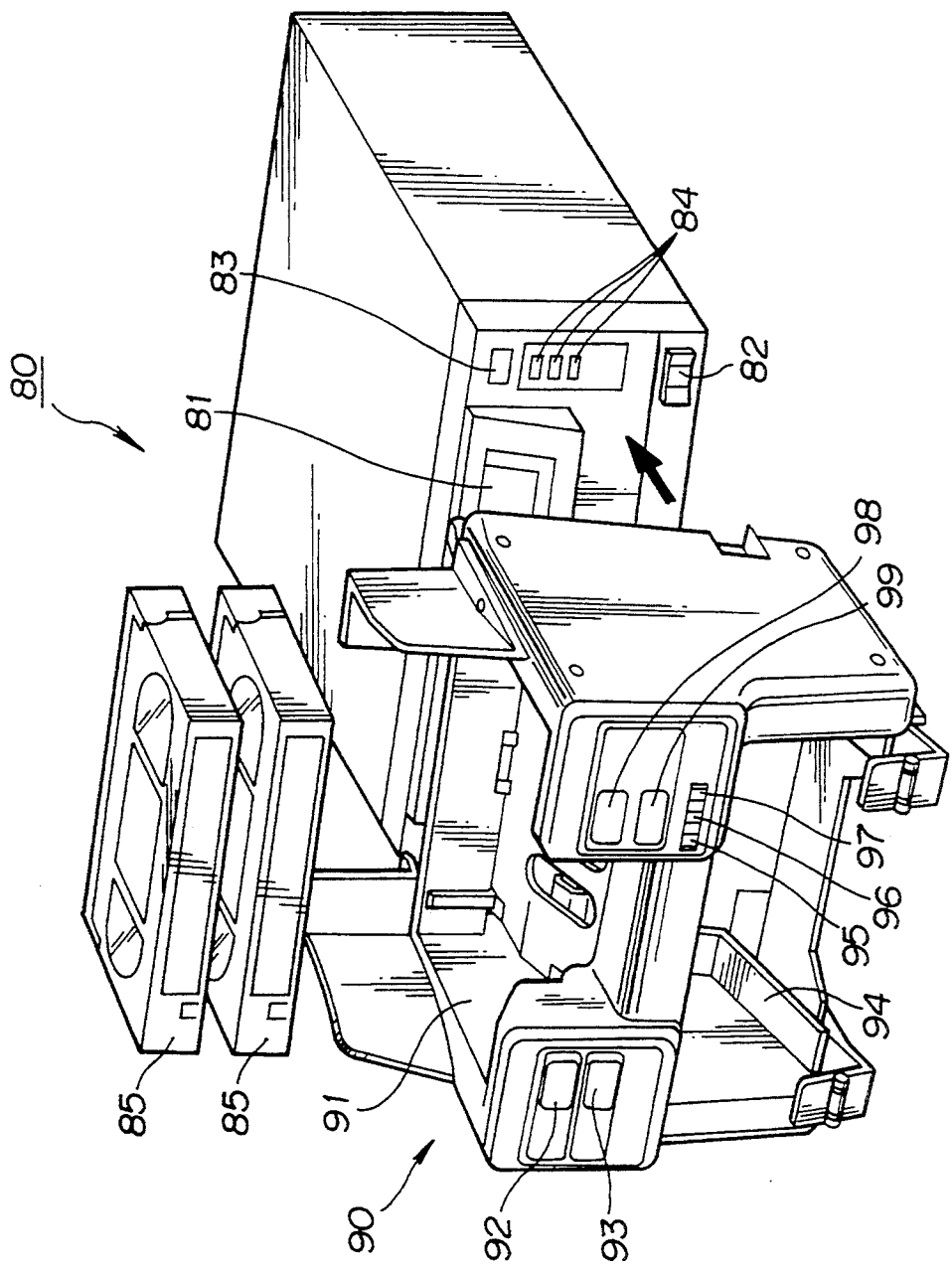
FIG. 10 is an exploded perspective view showing a particular embodiment of a duplicating VTR and a respective cassette changer that is desirably employed in the tape duplicating apparatus of FIG. 9.

Each of the VTRs 80 for tape duplication or dubbing is desirably employed in conjunction with a respective automatic tape changer 90, for example, as shown in FIG. 10. Each VTR 80 is shown to have, at its front panel, a cassette inserting opening 81, a power source switch 82, an eject button 83 and operating mode selecting buttons 84.

The automatic tape changer 90 for automatically inserting a video tape cassette 85 into the associated VTR 80 is mounted in front of the latter. The automatic tape changer 90 is shown to have an upper cassette holder 91 capable of holding a plurality, for example, four, video tape cassettes 85, and a lower cassette holder 94 capable of holding up to two cassettes 85 after the latter have been extracted or ejected from the associated VTR 80. At the front of the automatic tape changer 90, there are provided an upper empty indicator 92, a lower full indicator 93, a reset button 95, an eject button 96, a start button 97, a tape running indicator 98 and an automatic VTR OFF and error eject indicator 99. The upper empty indicator 92 is turned ON when there is no tape cassette 85 in the upper cassette holder 91. Further, the indicator 92 is intermittently turned ON when a tape cassette 85 in the upper holder 91 is incorrectly oriented. The lower full indicator 93 is maintained in its OFF condition when there is no tape cassette 85 in the lower cassette holder 94 or when the latter contains only one tape cassette 85. The indicator 93 is turned ON continuously when the lower cassette holder 94 is full, that is, when there are two cassettes 85 therein, and the indicator 93 is intermittently turned ON when the VTR 80 seeks to eject a cassette even though the lower cassette holder 94 contains its full complement of two tape cassettes 85. The indicators 92 and 93, when intermittently turned ON as described above, are desirably ON and OFF for equal intervals of, for example, 1 sec. The automatic OFF and error eject indicator 99 is turned ON continuously when no tape cassette 85 is loaded in the respective VTR 80, or at the time of the ejection of a cassette from the VTR. Further, the indicator 99 is intermittently turned ON, at an interval of, for example, 0.1 sec, when the respective VTR 80 has been automatically changed-over to its OFF mode, for example, in response to an indication that the VTR is not performing its recording operation in a normal manner. Alternatively, the indicator 99 is intermittently turned ON at an interval of, for example, 1 sec, when an error or malfunction occurs during the changer operation. When the error or cause of such malfunction has been cleared, the system can be reset by actuating the reset button 95, thereby to halt the intermittent energizing of the indicator 99 at the 1 sec. interval.

It will be appreciated that, in a tape duplicating apparatus according to the present invention, the control or command signals transmitted from the remote control unit 20 to the plurality of tape recording units or VTRs $10_1$–$10_n$ and the response signals from the VTRs $10_1$–$10_n$ are frequency and time-division multiplexed so that signal collision may be avoided while transmitting the control and response signals over a single bidirectional control signal line, with the result that the connections between the various components of the apparatus can be substantially simplified.

Further, in a tape duplicating apparatus according to this invention, the recording operation of each of the duplicating VTRs is checked automatically by the test procedure described above with reference to FIG. 6, and, in the event that such test procedure indicates improper recording of the test signals, the respective duplicating VTR is automatically turned off, thereby to ensure that the respective duplicated tape will not be marketed.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A tape duplication apparatus comprising:
   means constituting at least one source of video and audio signals;
   a plurality of tape duplicating units having recording and playback modes;
   means for connecting said tape duplicating units with said source in said recording mode of said tape duplicating units so that said tape duplicating units simultaneously record said video and audio signals on respective tapes in a recording operation carried out in the recording mode;
   test signal generating means for providing a test signal;
   means for applying said test signal to said tape duplicating units in said recording mode of the latter for recording said test signal;
   means for changing-over said tape duplicating units to said playback mode so as to reproduce the recorded test signal;
   detecting means associated with each of said tape duplicating units for indicating a defect in the recording operation thereof from the test signal reproduced therefrom; and
   control means responsive to said detecting means for rendering inoperative each of said tape duplicating units for which a defect in the recording operation of the latter is indicated,
   said control means being operative to cause each of said tape duplicating units for which said detecting means fails to detect a defect in the recording operation thereof to erase said recorded test signal and then to fully rewind the respective tape.

2. A tape duplicating apparatus comprising:
   means constituting at least one source of video and audio signals;
   a plurality of tape duplicating units having recording and playback modes;
   means for connecting said tape duplicating units with said source in said recording mode of said tape duplicating units so that said tape duplicating units simultaneously record said video and audio signals on respective tapes in a recording operation carried out in the recording mode;
   test signal generating means for providing a test signal;
   means for applying said test signal to said tape duplicating units in said recording mode of the latter for recording said test signal;
   means for changing-over said tape duplicating units to said playback mode so as to reproduce the recorded test signal;
   detecting means associated with each of the said tape duplicating units for indicating a defect in the recording operation thereof from the test signal reproduced therefrom; and
   control means for causing each of said tape duplicating units for which said detecting means detects no defect in the recording operation to erase said recorded test signal.

3. A method of duplicating a master tape recorded with video and audio signals, comprising:
   playing back said master tape so as to obtain said video and audio signals reproduced therefrom;
   applying the reproduced video and audio signals to a plurality of duplicating video tape recorders for simultaneous recording on respective tapes;
   selectively applying a test signal to said duplicating video tape recorders for recording on the respective tapes;
   reproducing the recorded test signal;
   detecting from each reproduced test signal whether there is a defect in a recording operation of a respective duplicating video tape recorder; and
   erasing the recorded test signal in each instance where a defect in the recording operation of a respective one of the duplicating video tape recorders is not detected.

* * * * *